(12) United States Patent
Adamec

(10) Patent No.: US 8,074,908 B2
(45) Date of Patent: Dec. 13, 2011

(54) PROCESS FOR THE COMMINUTION OF COMPOSITE MATERIALS

(76) Inventor: Thomas Adamec, Nürnberg (DE)

(*) Notice: Subject to any disclaimer, the term of this patent is extended or adjusted under 35 U.S.C. 154(b) by 297 days.

(21) Appl. No.: 12/375,248

(22) PCT Filed: Jul. 13, 2007

(86) PCT No.: PCT/EP2007/006220
§ 371 (c)(1),
(2), (4) Date: May 4, 2009

(87) PCT Pub. No.: WO2008/011993
PCT Pub. Date: Jan. 31, 2008

(65) Prior Publication Data
US 2009/0302139 A1 Dec. 10, 2009

(30) Foreign Application Priority Data

Jul. 27, 2006 (DE) .......................... 10 2006 034 692

(51) Int. Cl.
B02C 23/08 (2006.01)
(52) U.S. Cl. ........................................ 241/19; 241/79.1
(58) Field of Classification Search ................. 241/79.1, 241/19
See application file for complete search history.

(56) References Cited

U.S. PATENT DOCUMENTS 6,452,126 B1 9/2002 Xiao et al.
2002/0047058 A1* 4/2002 Verhoff et al. ................. 241/26
2008/0245906 A1* 10/2008 Kerns et al. ................ 241/24.31

FOREIGN PATENT DOCUMENTS

| DE | 43 19 989 | 12/1994 |
| DE | 197 15 772 | 7/1998 |
| DE | 197 26 105 | 12/1998 |
| DE | 100 31 260 | 1/2001 |
| DE | 103 44 861 | 4/2005 |
| DE | 10 2004 001 305 | 8/2005 |
| DE | 10 2004 041 494 | 3/2006 |
| EP | 1 747 870 | 1/2007 |
| WO | WO 2005/065848 | 7/2005 |

OTHER PUBLICATIONS

Yokoyama et al. "Recycling of Thermosetting Plastic Waste for Electronic Component Production Processes". Proceedings of the International Symposium on electronics and the Environment (ISEE). Orlando, May 1-3, 1995, pp. 132-137, XP000526874.

* cited by examiner

*Primary Examiner* — Bena Miller
(74) *Attorney, Agent, or Firm* — Hamre, Schumann, Mueller & Larson, P.C.

(57) ABSTRACT

The invention relates to a process for the comminution of composite materials, e.g. of electronics scrap, and also for the separation of the materials present therein, using a plurality of comminution stages and separation stages, with use of at least one hammer mill or rotor-impact mill (6), where, prior to the comminution of the material in the hammer mill or rotor-impact mill (6), a separation of previously comminuted composite material is achieved, into plastics on the one hand and composite material and also metals on the other hand.

15 Claims, 1 Drawing Sheet

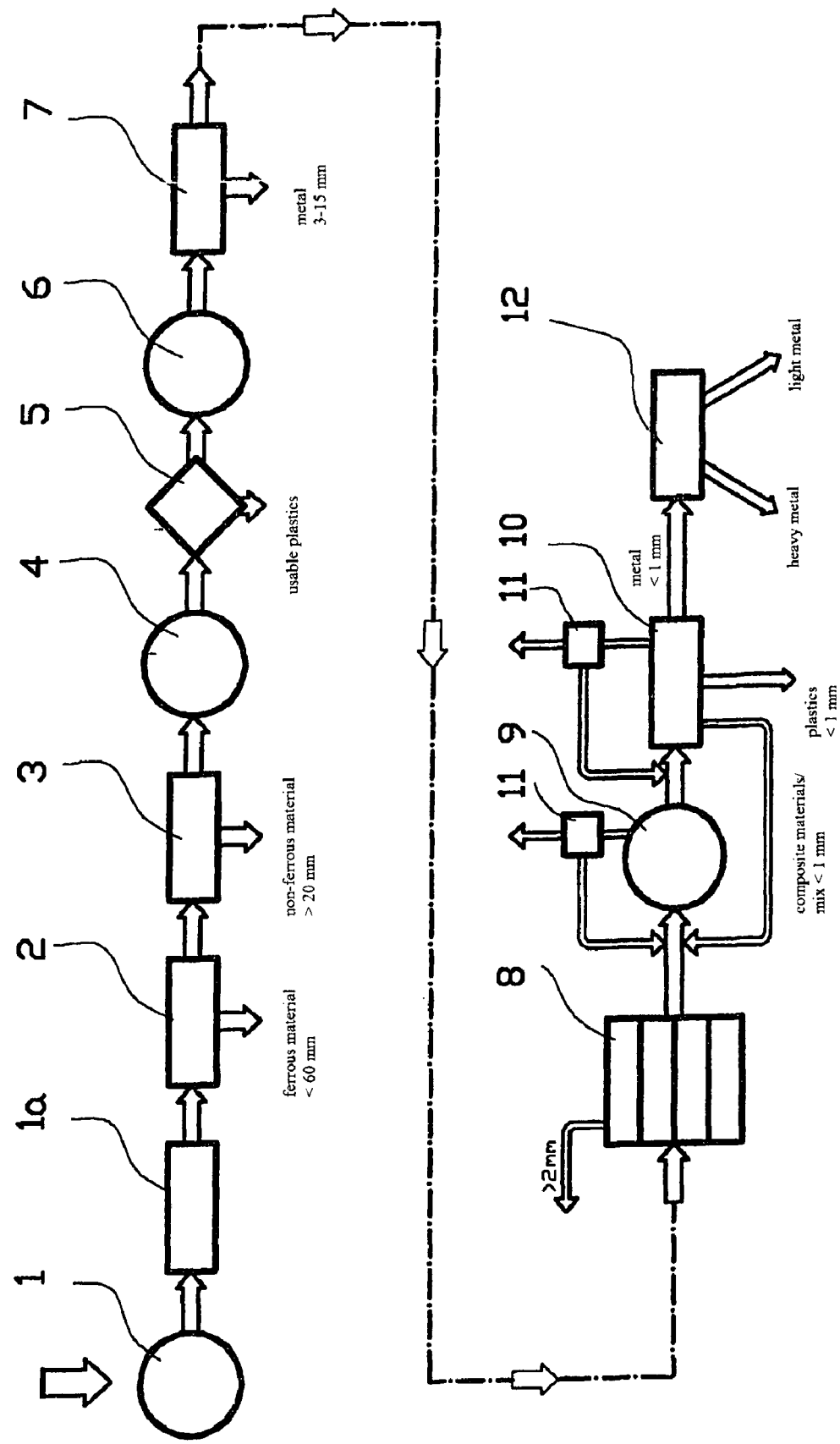

PROCESS FOR THE COMMINUTION OF COMPOSITE MATERIALS

The invention relates to a method for the comminution of composite materials, such as electronics scrap, and for the separation of the materials contained therein using a plurality of comminution and separation stages employing at least one hammer mill or rotor-impact mill.

To obtain recyclable material from composite materials which occur as waste, they must first be comminuted and then separated into the various reusable materials. Composite materials of this type are, for example, electronics scrap, which comprises electronic devices, such as telecommunications devices, computers, radios, televisions, or their parts, for example. Electronics scrap also includes circuit boards to be disposed of, whose fine metal parts may only be reclaimed if the circuit boards have been ground up finely.

Up to this point, it was typical to comminute electronics scrap of this type in so-called hammer mills, cutting mills, or cyclone mills. Various methods, such as winnowing, cyclone screening, gravity separation by concentrator tables, etc., are performed to fractionate the various materials. Nonetheless, an excessively high component of materials which is not sorted out remains in the residual product.

However, a specific utilization rate, which must be maintained, is prescribed by lawmakers. The utilization rate is a function of the product group. For telecommunication devices, a utilization rate of 85 weight-percent applies, which must be supplied to raw material recycling. The remainder may be energetically exploited or disposed of. The utilization rate has only been able to be achieved up to this point in that firstly a manual dismantling of the electronics scrap is performed, before the dismantled electronics scrap is supplied to the automated method. However, such a manual method has proven to be slow and very costly. The invention is based on the object of providing a method for comminuting composite materials and for separating the materials contained therein, using which a better degree of separation of the individual components is achieved.

This object is achieved according to the invention by the entire teaching of Claim 1. Advantageous refinements of the method result from Subclaims 2-13.

In the method according to the invention, a plurality of comminution and separation stages are provided employing a least one hammer mill or rotor-impact mill, before the comminution of the material in the hammer mill or rotor-impact mill, a separation of already-comminuted composite material into plastics on the one hand and composite material and/or metals on the other hand being performed. Usable and/or recyclable plastics may thus already be separated out before the supply to the hammer mill or rotor-impact mill. Only a lesser plastic component up to a specific particle size (in particular <3 mm) is still contained in the material thus supplied to the hammer mill or rotor-impact mill. The remaining metal-composite material mixture may thus be comminuted more easily in the hammer mill or rotor-impact mill. In contrast, if larger plastic parts were still present in this mixture, they would only deform and would hardly be comminuted. In contrast, the metal material and composite material which may be comminuted, in which glass fibers or carbon fibers may also be intercalated, for example, act like grist, which in turn favors further comminution. A better separation between plastics on the one hand and composite material and/or metals on the other hand is thus achieved overall. For example, using the method according to the invention, plastic parts of circuit boards are already essentially sorted out before the supply to the hammer mill or rotor-impact mill and may be supplied for reuse. The utilization rate of the plastics is nearly 98-99%.

The separation of already-comminuted composite material into plastics on the one hand and composite materials and/or metals on the other hand may be performed using x-ray transmission radiation. For this purpose, a device as is disclosed in DE 10 2004 001 790 A1 and WO 2005/065848 A1 may be used in particular. In this case, x-ray radiation penetrates the sorting material on the conveyor belt. An x-ray line sensor detects the transmission radiation as a high-resolution x-ray image. The greater the material density of the sorting product, the lower the resulting brightness of the image. The image material thus allows sorting according to the density of materials. The separation may be performed via compressed air by deflection of particles upward. Using this x-ray-based sorting system, in particular usable plastics may be sorted out. Chlorinated plastics (e.g., PVC), flame-retardant plastics (brominated), and strongly chlorinated elastomers may particularly advantageously be separated from the usable plastics. An elevated chlorine content is to be avoided in the thermal exploitation of old plastics, because dioxins may arise due to the combustion of the chlorine. Because of the chlorine content in PVC, for example, the density of these plastics increases significantly over others, so that this material may be sorted out well using the x-ray method. The method of the x-ray transmission radiation is especially suitable for the method according to the invention, because a relatively rapid outward transfer of plastic particles (in particular from 3 mm size) is possible. At a belt speed of approximately 3 m/s, a very high and effective material outward transfer is achieved. The overall method may thus be performed very rapidly and cost-effectively.

During the separation using x-ray transmission radiation, two x-ray radiation energy levels and their differentiation may be employed. As is disclosed in the above-mentioned patent specifications and already known from the prior art, by the observation of a high-resolution image in consideration of two x-ray radiation energy levels and the computer analysis of a resulting differential image, information may be obtained about the content materials of individual bulk good particles.

In addition to the separation using x-ray transmission radiation, a separation of different materials, in particular of different metals, may advantageously be performed using electromagnetic induction. Different metals are thus already separated from one another before the further comminution, so that a higher degree of sorting is achieved at the end.

In addition to the x-ray technology described above and alternatively or additionally to the induction technology, an optical separation of optically differing materials may expediently be performed. For example, metallic glossy materials may thus be separated from colored and/or coated materials. Different properties of the material such as grain size, shape, and color may thus be used for the sorting.

The optical separation is advantageously performed using camera technology. One or more cameras may be used, in front of whose lenses the comminuted materials pass.

Overall, a very high degree of sorting results using the x-ray technology, induction technology, and camera technology described above. The sequence of the different technologies may vary. The separation stages may also be used in island operation.

As already noted above, the composite material and metal material sorted out using x-ray transmission radiation are supplied to the hammer mill or rotor-impact mill. Before it is supplied to the hammer mill or rotor-impact mill, the material may be temporarily stored, a separate storage of various product types (e.g., telecommunications devices, domestic appliances, etc.), being able to be performed. A better separation of the individual materials may possibly also be achieved using such a separation according to product types.

The material comminuted in the hammer mill or rotor-impact mill may advantageously first run over a so-called bar sizer. Tangled cables and/or long, woolly material are separated on this vibrating bar sizer, the smaller compact material falling through between the bars.

In a further step, the comminuted compact material may be supplied to a heavy material sorter, in particular a winnower, which separates it into metals on the one hand and plastics and/or composite materials on the other hand. An optimum separation of the materials is possible, inter alia, because of their comminution in the hammer mill or rotor-impact mill. The relatively small plastic proportion at a grain size of <3 mm also allows a good separation.

The comminuted material may particularly advantageously be relayed after at least one comminution and/or separation stage by suction conveyance. The comminuted material is relayed in the partial vacuum method to the next comminution or separation stage, the suction and/or exhaust air being able to be guided via at least one filter or a filter system. A rapid further transport of the materials from one processing stage to the next is possible using the suction conveyance.

As already noted, the suction air employed for the suction conveyance may advantageously be guided via a least one filter. After the filter, the correspondingly filtered suction air exits to the outside. The suction air may also be returned back into the system, however, in particular if dust particles are still contained therein. The filtered exhaust air exiting to the outside thus no longer represents an environmental stress.

The filtrate remaining in the filter may expediently be returned into the comminution and/or separation process, so that finally all of the material is available. A high degree of utilization is thus achieved.

The filter may advantageously be implemented as self-cleaning. This means that the filter discharges the filtrate from a specific point in time, a specific accumulation of the filtrate, or a specific pressure loss on the filter, for example, so that the filtrate is returned back into the method. The filter and/or the filter system may be monitored and controlled by a computer and/or via a processor.

The filtrate may be returned via an airlock into the process, so as to be able to withdraw the bulk product with the lowest possible pressure losses. In particular, a rotary airlock may be provided here.

The composite and plastic material sorted out from the heavy material sorter may be supplied to a Multi-level screening facility, which sorts the material according to grain sizes and supplies it either to the hammer mill or rotor-impact mill (e.g., at a grain size>2 mm) or to the cyclone mill a (e.g., at a grain size<2 mm) for further composite separation. The material may run via a filter and/or a filter system in each case before the relay to the appropriate comminution mill.

In a roll-type corona electrostatic separator, metal, plastic, and metal-plastic material (composite material) may be sorted out. The roll-type corona electrostatic separator is expediently supplied with the material mixture of a grain size<1 mm, which comes from the cyclone mill.

Finally, the metal sorted out in the roll-type corona electrostatic separator may be sorted out according to light and heavy materials in a heavy material sorter, in particular a winnower.

An expedient design of the method according to the invention is explained in greater detail on the basis of the figure of the drawing. It shows a simplified schematic of the method according to the invention.

After delivery of composite materials, e.g., of electronics scrap, from which parts which contain pollutants have previously been sorted out manually if needed, these materials are supplied to the mechanical comminution of a hammer mill 1. The materials are comminuted to <60 mm therein.

Tangled cables and other long, woolly materials are sorted out on a bar sizer 1a. The fine material falls through between the bars and is subsequently sorted for ferrous material in an electromagnetic drum 2.

The non-ferrous material is sorted out in the adjoining cyclone separator 3.

The remaining material, which is not yet free of fine ferrous material and non-ferrous material, is supplied to a granulator 4. It cuts the material to <30 mm and prevents tangling, e.g., of remaining copper wires.

The material comminuted in the granulator 4 reaches a plastic separation facility 5, in which the already-comminuted composite material is sorted out into plastics on the one hand, and composite materials and metals on the other hand using x-ray transmission radiation. A plastic separation facility of this type is disclosed in DE 10 2004 001 790 A1 and WO 2005/065848 A1. A metal-free mixed plastic fraction is sorted out, which may be utilized in material recycling. Halogenated plastics (e.g., flame-retardant plastics) and metals in particular are contained in the remaining volume stream, which are processed further. The material stream output of usable plastics may be approximately 20%-40% depending on the starting material.

During the separation using x-ray transmission radiation, two x-ray radiation energy levels and their differentiation are employed.

In addition, both a separation of various metals using electromagnetic induction and also an optical separation of optically differing materials using camera technology are performed in the plastic separation facility 5. The material guided past the camera differentiates the material particles, e.g., the sorted-out plastic particles, according to size, and possibly shape and color. A separation of wood or ceramic particles is thus also possible.

The composite material and metal sorted out using x-ray transmission radiation are supplied to the rotor-impact mill 6 and re-comminuted therein. Because a significant component of the plastics was already sorted out beforehand in the plastic separation facility 5, the comminution process in the rotor-impact mill 6 is significantly more effective, because only a small plastic component having a grain size<3 mm is still present here. These smaller plastic components may be comminuted more easily. In addition, they contain comparatively more metal component and more glass fiber component, which acts like grist. Large plastic particles would only be deformed, in contrast.

The material comminuted in the rotor-impact mill 6 is supplied to a winnower 7, which separates it into metals on the one hand and plastics and/or composites on the other hand. Metal particles in the size from approximately 3 mm-15 mm are sorted out, the remaining material staying in the process and being supplied to a Multi-level screening facility 8. Material having a grain size of >2 mm is conducted back into the rotor-impact mill 6 again, while material>1.25 mm is supplied to the cyclone mill 9 for further comminution. The material comminuted therein is supplied together with the material sorted out from the Multi-level screen having a grain size<1.25 mm to a roll-type corona electrostatic separator 10.

Sorting out according to metal, plastic, and metal-plastic materials is performed therein. Finally, the metal is separated according to light and heavy metals in a winnower 12.

The comminuted material is relayed to a least one comminution and/or separation stage (e.g., before the supply to the rotor-impact mill 6) by suction conveyance. The pneumatic conveyance has been proven to be extremely effective and rapid. The suction air used for the suction conveyance is guided via at least one filter 11. The dust particles occurring in the suction air are thus filtered out and the resulting clean exhaust air is supplied to the outside air. The filtrate remaining in the filter 11 is returned back into the comminution and/or separation process, so that all of the material is available. In the schematically shown method sequence, this return of the filtrate into the process is only shown at the cyclone mill 9 and the roll-type corona electrostatic separator 10. However, it may also additionally or alternatively be provided at or after other comminution or separation stages.

The filters 11 clean themselves automatically, in that, for example, the quantity of the substrate collected therein or the pressure loss on the filter 11 is measured and the filtrate is removed beyond a specific value. The filtrate is returned back into the process via a rotary airlock.

LIST OF REFERENCE NUMERALS

1) Hammer mill
1a) Bar sizer
2) Electromagnetic drum
3) Cyclone separator
4) Granulator
5) Plastic separation facility
6) Rotor-impact mill
7) Winnower
8) Multi-level screening facility
9) Cyclone mill
10) roll-type corona electrostatic separator
11) Filter
12) Winnower

The invention claimed is:

1. A method for comminuting composite materials and for separating the materials contained therein using a plurality of comminution and separation stages employing at least one hammer mill or rotor-impact mill, comprising:
before the comminution of the material in the hammer mill or rotor-impact mill, performing a separation of already-comminuted composite material into a group including halogenated plastics, composite material, and metals, and another group including essentially halogen-free plastics, using x-ray transmission radiation to separate the two groups and sorting according to densities of materials, whereby the essentially halogen-free plastics being essentially sorted out.

2. The method according to claim 1, wherein two x-ray radiation energy levels and their differentiation are used during the separation using x-ray transmission radiation.

3. The method according to claim 1, wherein a separation of different metals is performed using electromagnetic induction.

4. The method according to claim 1, wherein an optical separation of optically differing materials is performed.

5. The method according to claim 4, wherein the optical separation is performed using camera technology.

6. The method according to claim 1, wherein using the x-ray transmission radiation and the sorting includes using electromagnetic induction and a camera technology,
wherein composite material and metal sorted out using the x-ray transmission radiation, the electromagnetic induction, and the camera technology are supplied to the rotor-impact mill.

7. The method according to claim 1, wherein the material comminuted in the hammer mill or rotor-impact mill is supplied to a heavy material sorter, which separates it into a group including metals and into another group including plastics and/or composites.

8. The method according to claim 1, wherein the comminuted material is relayed by suction conveyance after at least one comminution and/or separation stage.

9. The method according to claim 8, wherein the suction air employed for the suction conveyance is guided via at least one filter.

10. The method according to claim 9, wherein filtrate remaining in the filter is returned back into the comminution and/or separation process.

11. The method according to claim 9, wherein the filtrate is returned back into the process via an airlock.

12. The method according to claim 1, wherein the composite and plastic material sorted out from the heavy material sorter is supplied to a Multi-level screening facility.

13. The method according to claim 12, wherein the material of a specific grain size range sorted out in the Multi-level screening facility is supplied to a cyclone mill.

14. The method according to claim 1, wherein sorting out of metal, plastic, and metal-plastic material is performed in a roll-type corona electrostatic separator.

15. The method according to claim 14, wherein the sorted-out metal is sorted out according to light and heavy metals in a winnower.

* * * * *